Aug. 8, 1950   H. B. WEBER   2,518,406
JACKET FOR WRAPPING FOWL AND SIMILAR EDIBLES
Filed Feb. 9, 1949
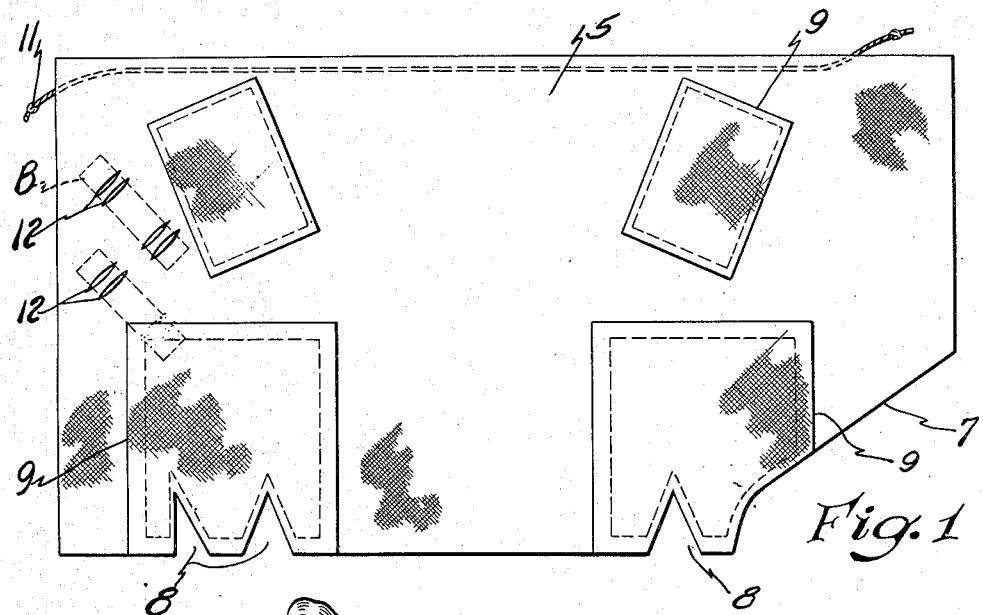
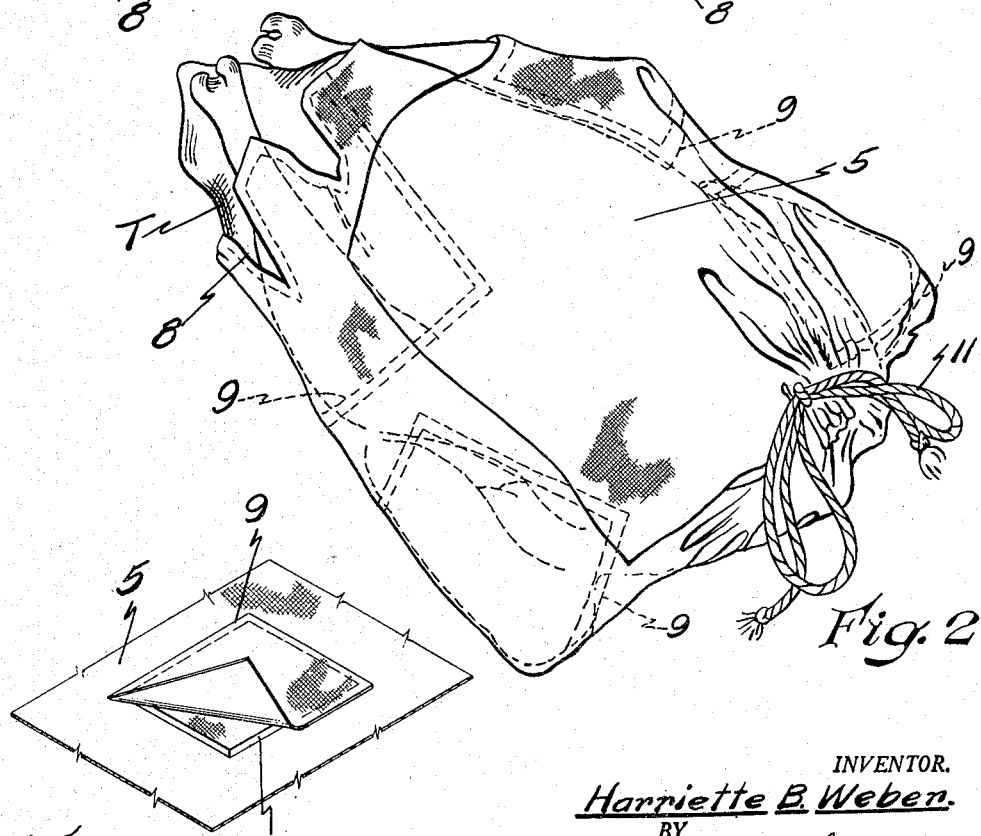
INVENTOR.
Harriette B. Weber.
BY
Frank C. Karman.
ATTORNEY Patented Aug. 8, 1950

2,518,406

UNITED STATES PATENT OFFICE 2,518,406

JACKET FOR WRAPPING FOWL AND SIMILAR EDIBLES

Harriette Burnece Weber, Saginaw, Mich.

Application February 9, 1949, Serial No. 75,377

4 Claims. (Cl. 99—174)

This invention relates to a jacket or covering in which a fowl or other edible is wrapped while being roasted in an oven.

One of the prime objects of the invention is to provide a flexible sheet or jacket in which a turkey or edible is wrapped and secured for protecting the high portions thereof during the roasting process, so that they will not dry out and become hard and brown when roasted.

Another object is to provide a flexible jacket which protects the upper portions of the turkey when placed in a roaster, insuring even and uniform roasting of the entire fowl, by retaining the grease in the meat surrounding the breastbone, legs and wings, thus eliminating any burned or brown or hardened portions.

Still a further object is to provide a flexible covering provided with spaced-apart slits therein, said slits being located directly over the breast of the turkey when it is wrapped for roasting, so that strips of bacon or the like can be inserted in said slits to secure them in position for supplying additional fat or greases at the high extremities of the turkey, and replacing the greases which naturally drain from the high extremities when the turkey is roasting.

Still another object is to design a jacket provided with spaced-apart pockets or swatches secured in predetermined locations on the jacket, so that these areas cover the legs and wings of the turkey when wrapped, and further to provide additional absorbent material in the pockets, which material assists in retaining the greases during the roasting and basting period.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a view of my turkey jacket showing it spread.

Fig. 2 is a view showing a turkey wrapped in the jacket.

Fig. 3 is a fragmentary view illustrating one of the pockets etc.

Referring now more specifically to the drawing in which I have shown the preferred embodiment of my invention, the jacket 5 is preferably formed of a sheet of woven material which can be of any desired size to suit the turkey, chicken, fowl or edible to be roasted, and I find it especially adaptable for use with turkeys, due to their size, and the fact that when a turkey is placed in a roaster (not shown), the breast is usually in close proximity to a heating element of the oven, consequently, the greases in the breast naturally drain away as the roasting progresses; this also holds true for the legs and wings, because of their relatively smaller bulk and because they project from the main body, and unless these portions are continuously basted, they will brown and burn during the roasting period and the turkey will be unevenly roasted.

The jacket 5 is formed as clearly shown in Fig. 1 of the drawing, the edge 7 being cut at an angle, and spaced-apart scallops 8 are provided in the lower edge to facilitate the wrapping operation and insure the edge of the jacket lying in intimate contact with the body of the turkey.

In order to somewhat retard the roasting of the legs and wings, I have provided pockets or swatch sections 9 so located that they lie directly over the legs and wings of the turkey when wrapped, and any desired absorbent material 10 can be provided in the pockets to retard the roasting action; these pockets can be secured in position by sewing, stapling, or in any other desired manner, and the added thicknesses also serve as a means of retaining greases, those in the body and applied when basting.

No pockets or swatches are required for the breast of the turkey, as the strip is of sufficient length to overlap on the breast when the turkey is wrapped, thus providing a double thickness of material at this point.

A cord 11 is gathered in the material at the upper edge of the jacket, with the ends of the cord hanging free, so that when the turkey T is wrapped, the ends of the cord can be pulled to shirr the cloth and completely enclose and cover the front end of the turkey, the cord then being tied to secure the jacket in position.

Spaced-apart pairs of slits 12 are provided adjacent the one end of the main strip 5, and strips of bacon or the like B can be threaded therethrough for supplying additional greases at this point.

In practice, the jacket is first placed in hot water, after which it is wrung out and dipped into a half-cup of shortening. The turkey is then wrapped in the jacket so that the bacon strips shown at B in Fig. 1 rests on and directly over the breast of the fowl, after which the cord 11 is pulled tight and tied.

The turkey is then placed in a roaster (not shown); then inserted in an oven, where it is roasted for a predetermined length of time, being also basted from time to time as desired, this method of roasting insuring the flavor being sealed in, and the meat will turn a golden brown and be uniformly and thoroughly roasted.

From the foregoing description, it will be obvious that I have perfected a very simple, practical and effective jacket for wrapping fowl for roasting.

What I claim is:

1. A flexible jacket for wrapping a turkey comprising, a rectangular strip of flexible woven material of a length sufficient to encircle a turkey and overlap, a cord gathered in the upper edge of the jacket with the ends hanging free to permit the material being drawn together to cover the front end of the turkey and be secured, and spaced scallops provided in the lower edge of said strip.

2. A jacket as defined in claim 1 in which pockets are secured on said material in predetermined locations, so that they lie over the wings and legs of the turkey when it is wrapped in said jacket.

3. A jacket as defined in claim 1 in which individual swatches or woven material are secured to said jacket in predetermined positions, said swatches being so located as to lie over the wings and legs of the turkey when wrapped in said jacket, and an absorbent material interposed between said swatches and the jacket.

4. A flexible jacket for wrapping a turkey comprising, a rectangular strip of flexible woven material of a length sufficient to encircle a turkey and overlap, a cord gathered in the material adjacent the upper edge thereof, with the ends hanging free to permit tying and bringing the edge together to close the upper end of the material when it is wrapped around a turkey, and spaced-apart slits provided in the strip adjacent one end thereof for securing strips of bacon in position therein.

HARRIETTE BURNECE WEBER.

REFERENCES CITED

The following references are of record in the file of this patent:

UNITED STATES PATENTS

| Number | Name | Date |
|---|---|---|
| 624,839 | Merrill et al. | May 9, 1899 |
| 635,840 | Birm | Oct. 31, 1899 |
| 683,760 | Hinkelman | Oct. 1, 1901 |
| 751,171 | Horn | Feb. 2, 1904 |
| 1,190,010 | Reubold | July 4, 1916 |